United States Patent Office 3,421,750
Patented Jan. 14, 1969

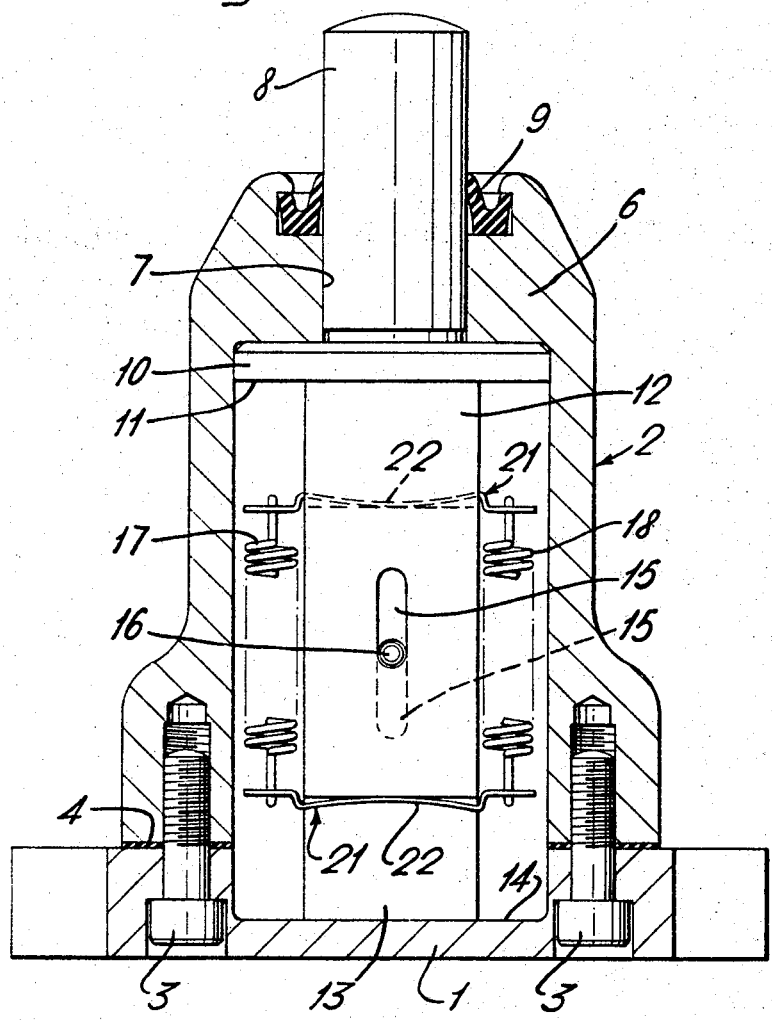

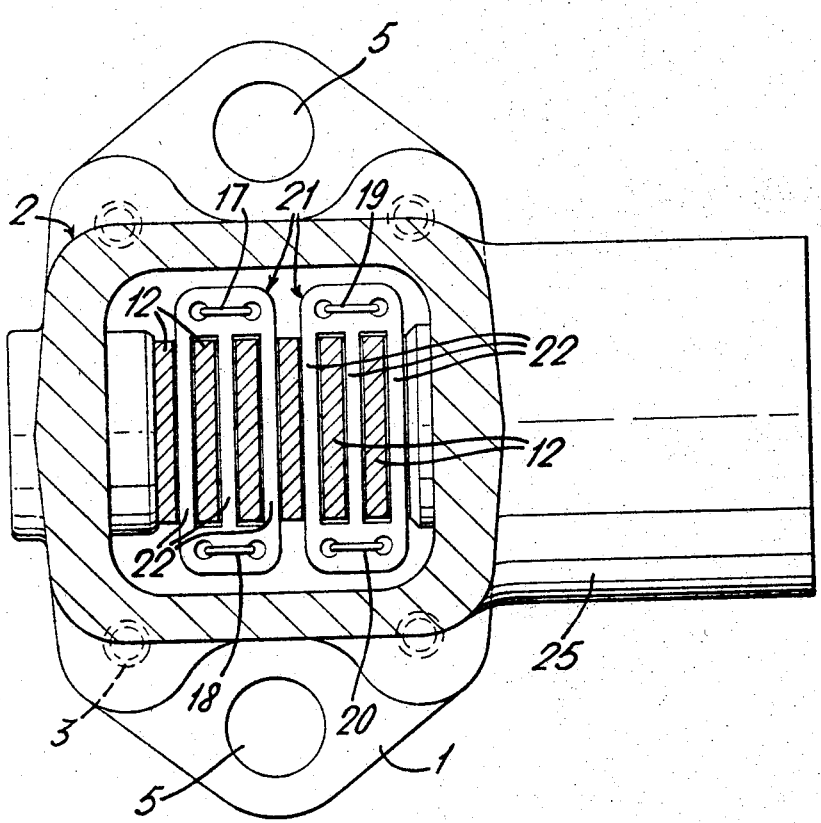

3,421,750
DEVICES FOR SUPPORTING WORKPIECES
Cyril W. Tridgell, Leverstock Green, England, assignor to Power Jacks Limited, London, England, a British company
Filed Jan. 11, 1967, Ser. No. 608,653
Claims priority, application Great Britain, Apr. 27, 1966, 18,493/66
U.S. Cl. 269—20     13 Claims
Int. Cl. B25b 1/00; B23q 3/04; B60t 7/00

ABSTRACT OF THE DISCLOSURE

An automatically adjustable jack whose movable work supporting plunger is itself supported by two relatively movable sets of interleaved friction plates which are clamped together, preferably by a hydraulic piston operating at right angles to the plates, to hold the plunger in a desired work supporting position of adjustment.

---

This invention relates to devices for supporting workpieces, particularly for use in circumstances where a part of a work-piece which is to be machined, e.g. milled or drilled, overhangs a fixed work table or other support or is supported between two such supports, and must as a result be provided with additional support whilst being machined.

Many devices are of course known for such a purpose, but all of these have certain disadvantages. Thus screw-operated jacks are known but these have the disadvantage that excessive load can accidentally be applied to the work-piece when positioning the jack, which may shift or even distort it. Wedge-type jacks are also known which are locked by hydraulic pressure but in this case the load which can be supported is relatively low, and a further notable disadvantage lies in the fact that the load on the jack is transmitted back into the hydraulic system. Again, hydraulically locked work supports are known in which hydraulic pressure is employed to clamp collets or a sleeve about a sliding plunger which supports the work-piece, but the load which can be supported is again limited and also the friction surfaces on the plunger and the sleeve or collets have to be formed to very close tolerances.

According to the present invention there is provided a device for supporting a work-piece, comprising a support member and a base, said member and base being mounted for relative movement in the direction of the longitudinal axis of the device, two interleaved sets of friction plates disposed between the said support member and the said base and having their planes parallel with the longitudinal axis of the device, and fluid pressure operable means movable to clamp the said sets of plates together, said sets of plates then serving to support the said support member against inward movement relative to the said base, and said sets of plates being relatively movable when said fluid pressure operable means is not operated so as to accommodate said relative movement of the support member and the base.

Such a support, itself supported on some suitable surface, may be placed adjacent, usually underneath, a work-piece and the said support member thereof engaged with the work-piece. The sets of friction plates may then be clamped together to prevent movement of the support member inwardly relative to the base, i.e. to prevent such movement of the support member as to disengage it from the work-piece.

In a preferred form of the invention the device includes a housing enclosing the said sets of friction plates and mounting the said fluid pressure operable means. Where such a housing is provided the said support member may form an integral part of it, e.g. the housing may be of two-piece telescopic form of which the upper part includes the support member and the lower part includes the said base; the said fluid pressure operable means could then be mounted in either part of the housing.

Preferably, however, the said support member comprises a plunger axially slidable in an opening in a top wall of the said housing, and the said base is the base of the housing.

The said fluid pressure operable means may comprise a piston which may be slidably mounted in a bore formed in a wall of the said housing and directly engageable with the face of an end one of said friction plates by movement perpendicularly to the said longitudinal axis of the device.

It will be understood that the weight of a supported work-piece will be transmitted through the said support member to the friction plates in operation, and will be supported by the frictional interengagement of the clamped plates. The fluid pressure operated clamping means will generally be movable substantially perpendicularly to the planes of the plates to clamp the same together, and as a result no part of the inward compressive force on the support member will be transmitted back through the clamping means into the fluid pressure system. We have found that, as a result, one device constructed in accordance with the invention can support a load of 3000 lbs. by the application of a clamping force of 1050 lbs. to a piston constituting the friction plate clamping means.

We prefer to provide the said clamping piston with spring return means to ensure its return to an inoperative position and consequent unclamping of the friction plates when the fluid pressure is released.

The said housing preferably takes the form of a chamber sealed to prevent the ingress of dust or other foreign matter which might interfere with the efficient operation of the device.

Although the said support member could be moved by hand into its operative position engaging a work-piece, this may be inconvenient in some circumstances. In a preferred form of the invention, therefore, the device includes spring means operative continually to urge the said support member away from the said base.

Very conveniently the said spring means may be arranged to operate directly on the respective sets of friction plates to urge such sets of plates apart in directions parallel to their planes, at the same time acting indirectly on the support member via one set of plates.

The friction plates of said one set could be connected together at their ends to form a comb-like structure, which could again be connected to the support member or a part thereon for movement therewith. Such a structure would, however, have to be formed to fine tolerances to ensure effective co-operation of all of the friction plates of the two sets. Preferably, therefore, the plates of said one set engage the support member or a part thereon but are not connected therewith or with one another, the said spring means being arranged to act individually on each plate of such one set so as continually to maintain their engagement with the support member.

The same may said of the other set of plates so far as concerns their mutual interconnection and relationship with said base. Thus, in a preferred form of the invention the plates of the other set engage the said base but are not connected to said base or to one another, the said spring means being arranged to act individually on each plate of said other set so as continually to maintain their engagement with the said base.

When the friction plates of each set are separate from one another as aforesaid they will preferably be constrained against sliding movement relative to one another traversely of the longitudinal axis of the device by a rod passing through corresponding elongate slots in all of the plates.

The said spring means may, as in a preferred embodiment, comprise at least one co-acting pair of helical tension springs, the springs of the or each pair being arranged on opposite sides of the friction plates on which they act and being interconnected at their corresponding ends by spring strips extending along the end faces of such plates.

Conveniently the or each pair of tension springs may act on two or more friction plates from each of said sets, the corresponding ends of such tension springs being interconnected by a group of two or more of said spring strips extending one along the end face of each of the associated friction plates, the spring strips of each of said groups being integrally interconnected at their ends to form a grid-like member and each of said strips being bowed towards its associated friction plate to ensure continuity of engagement therewith. The provision of the latter means for ensuring continuity of engagement of the spring strips with their respective friction plates is important where the plates of the respective sets are separate from one another as aforesaid, as otherwise a plate which was slightly shorter than its neighbors might not be engaged by its associated spring strip and thus not urged into engagement with the said support member or the said base as the case may be; such a plate would thus take no part in the load-supporting function of the device and the load-bearing ability thereof would thereby be correspondingly lessened. It will be understood, moreover, that the provision of such means does in fact enable the friction plates to be formed with quite large tolerances in their length, which of course reduces their cost. Moreover, where the friction plates of each set are separate from one another, similar tolerances may be permitted in their thicknesses as the interleaved plates may then, of course, be clamped closely together whatever their thicknesses.

In order that the invention may be more readily understood, one embodiment of a device according to the same will now be described my way of example and with reference to the accompanying drawings, in which:

FIG. 2 is a further vertical section, taken on the line II—II of FIG. 1; and

FIG. 3 is a partial horizontal section, taken on the line III—III of FIG. 1.

Figure 1:
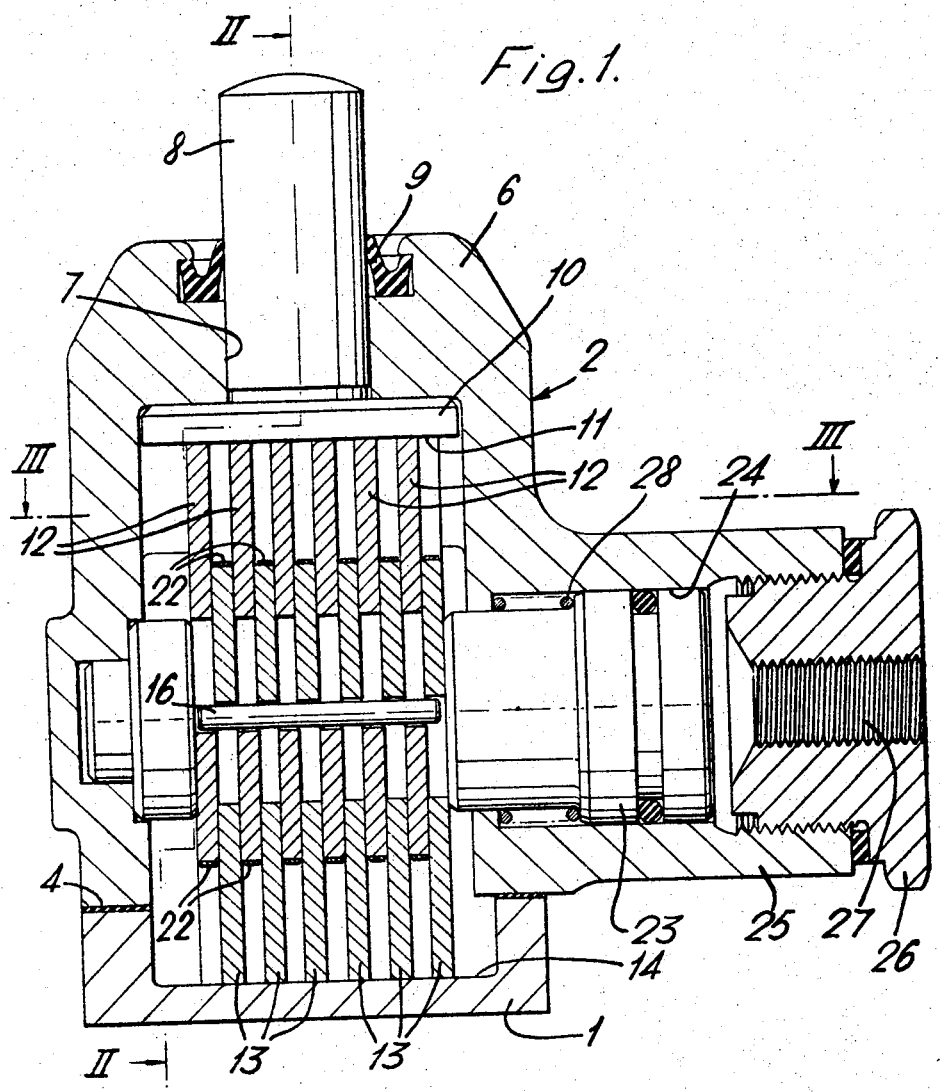
FIG. 1 is a vertical medial cross-section through the device.

Referring to the drawings, the device comprises a housing having a base 1 and a body 2 secured together by bolts 3 and sealed by a gasket 4. The base is formed with bores 5 to enable the device to be secured to a supporting surface.

The top wall or roof 6 of the housing body 2 is formed with a bore 7 in which a work-piece support member in the form of a plunger 8 is slidable. Ingress of dust is prevented by a wiper 9. The plunger 8 is radially enlarged at its inner end to form an integral disc 10 having a flat reaction surface 11.

Within the housing body 2 are two interleaved sets of similar ground steel friction plates 12 and 13 respectively. The respective sets of plates are urged apart in directions parallel to their planes by means described hereinafter, whereby the top end faces of the plates 12 of the upper set continually engage the reaction surface 11 on the plunger 8, whilst the bottom end faces of the plates 13 of the lower set engage a reaction surface 14 formed by the top of the housing base 1. All of the friction plates 12 and 13 are separate entities but each is formed with an elongate slot 15 in which a rod 16 is mounted to prevent sliding displacement of the plates other than in a vertical direction as seen in the drawings.

The means urging the sets of plates apart comprise four helical tension springs 17 to 20 arranged in co-acting pairs 17–18 and 19–20, the upper and lower ends of each such pair of springs being interconnecting by a spring steel grid member 21 best seen in FIG. 3. Each such grid member provides three spring strips 22 which extend one along each of the inner end faces of the friction plates. It will be understood that the effect of such arrangement is to urge the plates 12 of the upper set upwardly into engagement with the upper reaction surface 11, and the plates 13 of the lower set downwardly into engagement with the lower reaction surface 14. The spring strips 22 are all bowed towards their associated friction plates, as best seen in FIG. 2, to ensure continuity of engagement therewith even if one of the plates is slightly shorter than its neighbors.

The friction plates 12 of the upper set are thus so mounted as to follow the movement of the plunger 8 as it slides in the bore 7.

Means for clamping the sets of friction plates together against relative sliding movement are provided in the form of a piston 23 slidable in a bore 24 in a tubular extension 25 of the housing body 2. A plug 26 is screw-threadedly mounted in the extension 25 and is itself formed with an internally threaded bore 27 for connection to a source of fluid pressure. Application of fluid pressure to the piston 23 via the bore 27 will cause the piston to move inwardly to clamp the sets of plates together and thus prevent inward movement of the piston 23 under load in any load-supporting position of the plunger. The inner end of the plunger 8 is of reduced diameter and is surrounded by a compression spring 28 operable to return the piston to its inoperative position when the fluid pressure thereon is released, so as to free the friction plates for sliding movement once again. It will be understood that the degree of movement of the piston 23 between its operative and inoperative position need only be very small.

In use the device will generally be secured to a suitable supporting surface, for example the bed of a milling or drilling machine, in the upright position illustrated in the drawings. Then, when a work-piece is placed on the machine a part thereof to be supported will seat on the plunger 8 which will move inwardly of the housing to an extent decreed by the form of the work-piece and, in particular, by any small variations in the dimensions of the latter. The fluid pressure for operating the piston 23 may be taken from the same system as is employed to clamp the work-piece in position at other locations and the friction plates will thus be clamped together at the same time as the over-all clamping of the work-piece is effected.

It will thus be seen that the invention provides a simple, robust and inexpensive device for supporting a work-piece, most of whose components may be manufactured to quite broad dimensional tolerances. None of the load applied to the device by a supported work-piece is transmitted into the fluid pressure system and, moreover, the pressure exerted on a work-piece by the support member during positional adjustment of the latter is small, being limited to that applied to such member by the aforementioned tension springs; shifting or distortion of the work-piece during such adjustment of the device is thus prevented.

I claim:

1. A device for supporting a work-piece, comprising a support member and a base, said member and base being mounted for relative movement in the direction of the longitudinal axis of the device, two interleaved sets of friction plates disposed between the said support member and the said base and having their planes parallel with the longitudinal axis of the device, and fluid pressure operable means movable to clamp the said sets of plates together, said sets of plates then serving to support the said support member against inward movement relative to the said base, and said sets of plates being relatively movable when said fluid pressure operable means is not operated so as to accommodate said relative movement of the support member and the base.

2. A device as claimed in claim 1, including a housing enclosing the said sets of friction plates and mounting the said fluid pressure operable means.

3. A device as claimed in claim 2, wherein the said housing has a bore formed in a wall thereof and the said fluid pressure operable means comprises a piston slidable in said bore and directly engageable with the face of an end one of said fraction plates by movement perpendicularly to the said longitudinal axis of the device.

4. A device as claimed in claim 3, including resilient means operative to bias the said piston away from the friction plates.

5. A device as claimed in claim 2, wherein the said housing comprises a sealed chamber.

6. A device as claimed in claim 2, wherein the said housing has a top wall formed with an opening therein and the said support member comprises a plunger axially slidable in said opening, and the said base being the base of the housing.

7. A device as claimed in claim 1, including spring means operative continually to urge the said support member away from the said base.

8. A device as claimed in claim 7, wherein the said spring means operates directly on the respective sets of friction plates to urge such sets of plates apart in directions parallel to their planes, and acts on the said support member via one set of plates.

9. A device as claimed in claim 8, wherein the plates of said one set engage the support member or a part thereon but are not connected therewith or with one another, the said spring means being arranged to act individually on each plate of such one set so as continually to maintain their engagement with the support member.

10. A device as claimed in claim 9, wherein the plates of the other set engage the said base but are not connected to said base or to one another, the said spring means being arranged to act individually on each plate of said other set so as continually to maintain their engagement with the said base.

11. A device as claimed in claim 10, wherein each of the said friction plates is formed with an elongate slot, and including a rod passing through the elongate slots in all of the friction plates, said rod being operative to constrain the said friction plates against sliding movement relative to one another transversely of the longitudinal axis of the device.

12. A device as claimed in claim 8, wherein the said spring means comprises at least one co-acting pair of helical tension springs, the springs being arranged on opposite sides of the friction plates on which they act, and spring strips extending along the end faces of such plates and interconnecting the said springs at corresponding ends thereof.

13. A device as claimed in claim 12, wherein said tension springs act on at least two friction plates from each of said sets, the corresponding ends of such tension springs being interconnected by said spring strips extending one along the end face of each of the associated friction plates, the spring strips being integrally interconnected at their ends to form a grid-like member and each of said strips being bowed towards its associated friction plate to ensure continuity of engagement therewith.

References Cited

UNITED STATES PATENTS

| | | | |
|---|---|---|---|
| 711,722 | 10/1902 | Hanson | 269—309 |
| 1,437,291 | 11/1922 | Corporon | 188—129 X |
| 2,424,090 | 7/1947 | Gordinier | 269—310 |
| Re. 23,732 | 11/1953 | Cleveland | 269—310 |
| 2,952,030 | 9/1960 | Guilbert | 188—129 X |

ROBERT C. RIORDON, *Primary Examiner.*

JAMES F. McKEOWN, *Assistant Examiner.*

U.S. Cl. X.R.

188—129; 269—310